(12) United States Patent
Haslam

(10) Patent No.: US 9,508,077 B2
(45) Date of Patent: Nov. 29, 2016

(54) PODCASTING HAVING INSERTED CONTENT DISTINCT FROM THE PODCAST CONTENT

(75) Inventor: David Haslam, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 905 days.

(21) Appl. No.: 11/315,760

(22) Filed: Dec. 19, 2005

(65) Prior Publication Data

US 2007/0027958 A1 Feb. 1, 2007

Related U.S. Application Data

(60) Provisional application No. 60/703,696, filed on Jul. 29, 2005.

(51) Int. Cl.
| | |
|---|---|
| G06F 15/177 | (2006.01) |
| G06Q 30/02 | (2012.01) |
| H04N 21/234 | (2011.01) |
| H04N 21/458 | (2011.01) |
| H04L 29/08 | (2006.01) |

(52) U.S. Cl.
CPC ........ *G06Q 30/02* (2013.01); *H04N 21/23424* (2013.01); *H04N 21/458* (2013.01); *H04L 67/06* (2013.01)

(58) Field of Classification Search
USPC ........................................................ 709/220
See application file for complete search history.

(56) References Cited

U.S. PATENT DOCUMENTS

| | | | |
|---|---|---|---|
| 2002/0073424 A1* | 6/2002 | Ward et al. ..................... | 725/42 |
| 2004/0215643 A1* | 10/2004 | Brechner et al. ............ | 707/100 |
| 2005/0097599 A1* | 5/2005 | Plotnick et al. ................ | 725/32 |
| 2005/0165795 A1* | 7/2005 | Myka et al. .................. | 707/100 |
| 2005/0234875 A1* | 10/2005 | Auerbach et al. ................ | 707/3 |
| 2005/0246311 A1* | 11/2005 | Whelan et al. .................... | 707/1 |
| 2005/0289137 A1* | 12/2005 | Wu et al. .......................... | 707/4 |
| 2006/0010162 A1* | 1/2006 | Stevens et al. ............ | 707/104.1 |
| 2006/0020937 A1* | 1/2006 | Schaefer ...................... | 717/175 |
| 2006/0031263 A1* | 2/2006 | Arrouye et al. .............. | 707/200 |
| 2006/0075034 A1* | 4/2006 | Lakkala et al. ............... | 709/206 |
| 2006/0092282 A1* | 5/2006 | Herley et al. ............ | 348/207.99 |
| 2006/0265409 A1* | 11/2006 | Neumann et al. ............ | 707/100 |
| 2006/0265503 A1* | 11/2006 | Jones ............................ | 709/227 |
| 2006/0265637 A1* | 11/2006 | Marriott et al. ........... | 715/500.1 |

* cited by examiner

*Primary Examiner* — Richard G Keehn
(74) *Attorney, Agent, or Firm* — Garlick & Markison; Bruce E. Stuckman

(57) ABSTRACT

Disclosed herein are systems, devices, and methods for providing a podcast file that has inserted content that is distinct from the content of the podcast. A remote server provides a web page to a subscriber computing device via a network, and a subscriber computing device transmits a podcast file to the remote server via the network. The remote server inserts content into the podcast file and provides the podcast file along with the inserted content for access from the web page. The remote server transmits the podcast file along with the inserted content responsive to requests from the subscriber computing devices. The subscriber computing devices can process and play the podcast content along with the inserted content from the remote server.

18 Claims, 11 Drawing Sheets

PODCASTING HAVING INSERTED CONTENT DISTINCT FROM THE PODCAST CONTENT

RELATED APPLICATIONS

The present application claims priority to U.S. Provisional Application 60/703,696, filed on Jul. 29, 2005, and entitled PODCASTING HAVING ADVERTISEMENTS.

BACKGROUND

Podcasting is a form of digital broadcasting on any subject that anyone would like others to listen to. Podcast files are created and posted to the Web in formats such as the popular MP3 format that can be downloaded to a computer and listened to. Podcasting has begun to differentiate itself from a standard MP3 downloads as podcast files may now have their own format and yet such podcasting formats continue to be easily downloaded to an MP3 player (e.g., iPod® player). Podcasting is becoming more and more popular and can be found throughout the Internet at web sites of various podcast host servers. A podcast host server receives a podcast file and makes it accessible through the Internet without changing the content of the podcast files. Such podcast files may categorized so that interested listeners can search podcast files according to the category of interest.

SUMMARY

Exemplary embodiments of the present disclosure provide systems, devices, and methods for providing a podcast file that has inserted content such as an advertisement or a news bulletin that is distinct from the podcast content. In one embodiment, the system comprises a remote server that provides a web page to a subscriber computing device via a network, and a subscriber computing device transmitting a podcast file to the remote server via the network. The remote server inserts content that is distinct from the podcast content in the podcast file, such as when storing the podcast file with the inserted content in a podcast database of the remote server or later when providing the podcast file upon request from a subscriber. The remote server transmits the podcast file along with the inserted content responsive to request from subscriber computing devices such as the subscriber computing device that transmitted the podcast file and/or other subscriber computing devices. The subscriber computing devices can process and play the podcast file along with the inserted advertisement from the remote server.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE DISCLOSURE

Figure 1:
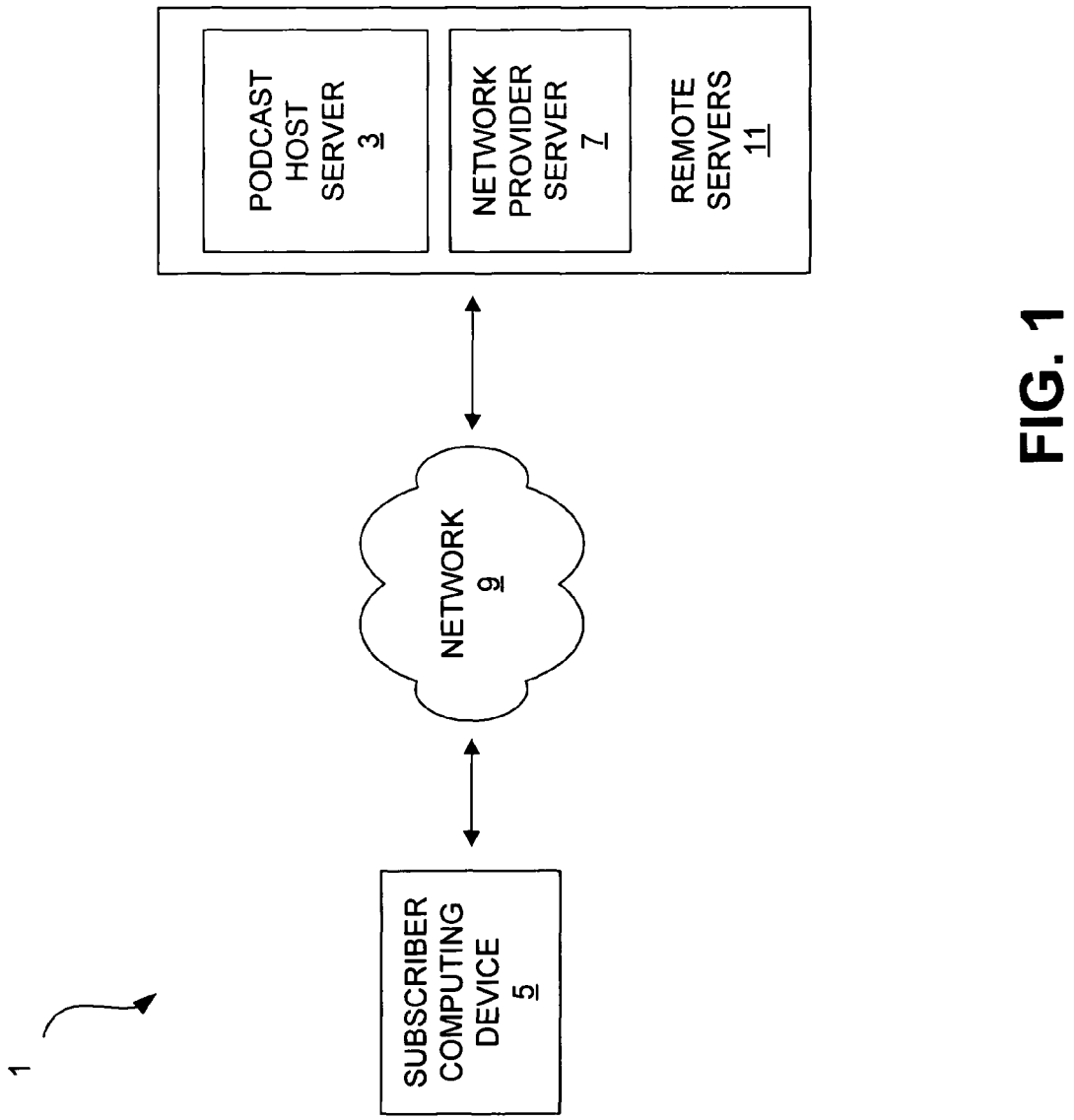
FIG. 1 is systematic view of an embodiment of a system from which a plurality of podcast files can be presented via a network.

Referring now in more detail to the figures in which like reference numerals identify corresponding parts, FIG. 1 illustrates an example system 1 that inserts an advertisement in a podcast file and provide the podcast file to a subscriber computing device. As indicated in this figure, the system 1 generally comprises a subscriber computing device 5, network 9, and remote servers 11. The remote servers 11 can include, but are not limited to, podcast host server 3 and network provider server 7. Although FIG. 1 shows one subscriber computing device 5, one podcast host server 3 and one network provider server 7, it should be appreciated that there may be multiple subscriber computing devices 5 including those that transmit podcast files and those that receive podcast files, multiple podcast host servers 3, and multiple network provider servers 7.

The subscriber computing device 5 establishes connection to the network 9 via network provider server 7, which enables the subscriber computing device 5 to communicate through the network 9. A remote server 11 can receive a podcast file from a subscriber computing device 5 or other remote servers 11, such as from a podcast host server 3 or network provider server 7. When the remote server 11 receives the podcast file, the remote server 11 insert content, such as an advertisement, into the podcast file. It will be appreciated that other content besides an advertisement can be inserted into the podcast file, such as a news bulletin or additional information related to the topic of the podcast content For ease of explanation, the description that follows is directed to insertion of advertisements. In an exemplary embodiment, the network provider server 7 can provide a web page of the network provider that provides podcast files to the subscriber computing device 5 or other subscriber computing devices that have not transmitted podcast files to the remote servers 11, which the web page is shown and described in relation to FIG. 4. In another exemplary embodiment, the subscriber computing device 5 or other subscriber computing devices can access a web page from the podcast host server 3 to download and listen to podcast files stored on the podcast host server 3, which the web page is shown and described in relation to FIG. 3.

Figure 2:
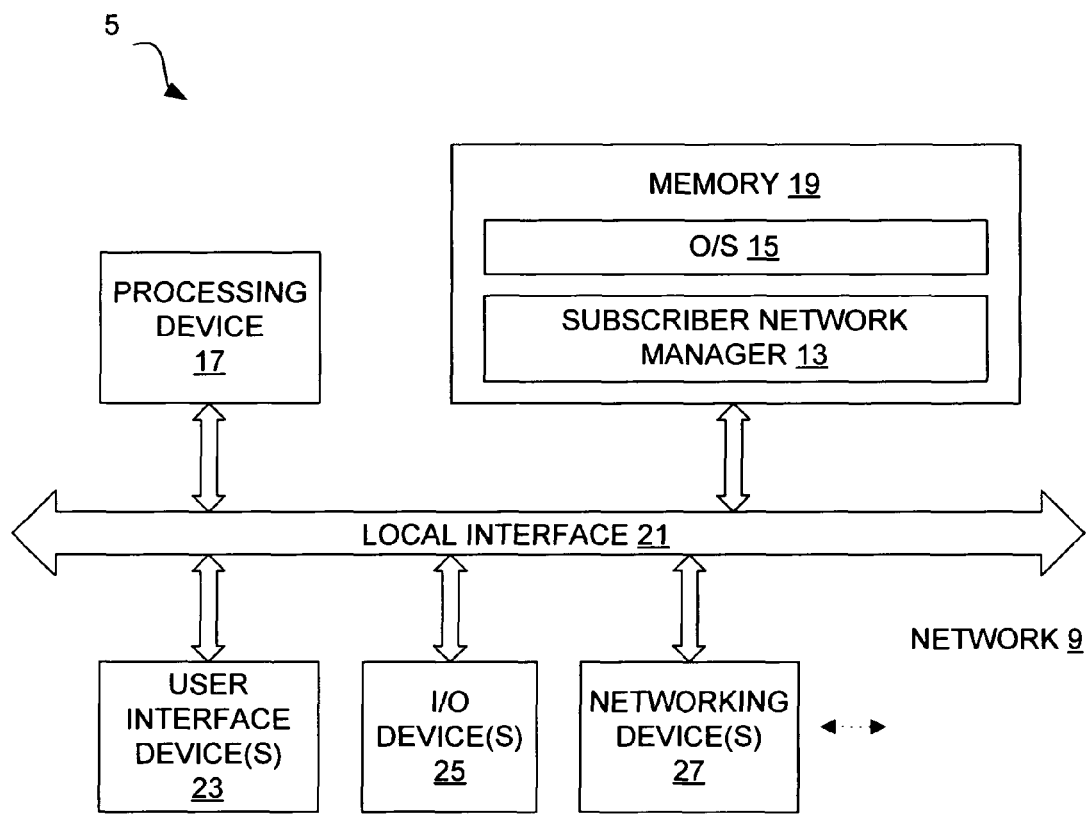
FIG. 2 is a block diagram of an embodiment of a subscriber computing device shown in FIG. 1.

FIG. 2 is a block diagram illustrating an exemplary architecture for the subscriber computing device 5 shown in FIG. 1, which may also be an exemplary architecture for a subscriber computing device that does not transmit podcast files to the remote servers 11 but instead access podcast files from those remote servers 11. As indicated in FIG. 2, the subscriber computing device 5 comprises a processing device 17, memory 19, one or more user interface devices 23, one or more I/O devices 25, and one or more networking devices 27, each of which is connected to a local interface 21. The processing device 17 can include any custom made or commercially available processor, a central processing unit (CPU) or an auxiliary processor among several processors associated with the subscriber computing device 5, a semi-conductor base microprocessor (in the form of a microchip) or a macroprocessor. The memory 19 can include any one or a combination of memory elements (e.g., random access memory (RAM, such as DRAM, SRAM, etc.)) and nonvolatile memory elements (e.g., ROM, hard drive, tape, CDROM, etc.).

The one or more user interface devices 23 comprise those components with which the subscriber can interact with the subscriber computing device 5. Where the subscriber computing device 5 comprises a desktop computer, laptop computer, or similar devices, these components can comprise those typically used in conjunction with a PC, such as a display device, keyboard and mouse.

The one or more I/O devices 25 comprise components used to facilitate connection of the subscriber computing device 5 to other devices and therefore, for instance, comprise one or more serial, parallel, small system interface (SCSI), universal serial bus (USB), or IEEE 1394 (e.g., Firewire™) connection elements. The networking devices 27 comprise the various components used to transmit and/or receive data over the network 9, where provided. By way of example, the networking devices 27 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The memory 19 normally comprises various programs (in software and/or firmware) including an operating system (O/S) 15 and a subscriber network manager 13. The O/S 15 controls the execution of programs, including the subscriber network manager 13. The O/S 15 also provides scheduling, input-output control, file and data management, memory management, and communication control and related services. The subscriber network manager 13 facilitates the process for providing a podcast file to a remote server 11 that inserts content distinct from the podcast content, such as an advertisement, in the podcast file and for receiving the podcast file along with the inserted content that is presented to a subscriber.

According to an exemplary embodiment, the subscriber network manager 13 facilitates communication between the subscriber computing device 5 and other subscriber computing devices and remote servers 11 via the network 9. The subscriber computing device 5 can provide a remote server 11 with a podcast file so that the remote server 11 can store the podcast file in a podcast database and insert the podcast file with an advertisement. The subscriber computing device 5 as well as other subscriber computing devices access web pages from remote servers 11 via the network 9 and the web pages include links that enables the subscriber computing devices to download a podcast file that contains advertisements. Operation of the subscriber network manager 13 is described in relation to FIGS. 11-13.

Figure 3:
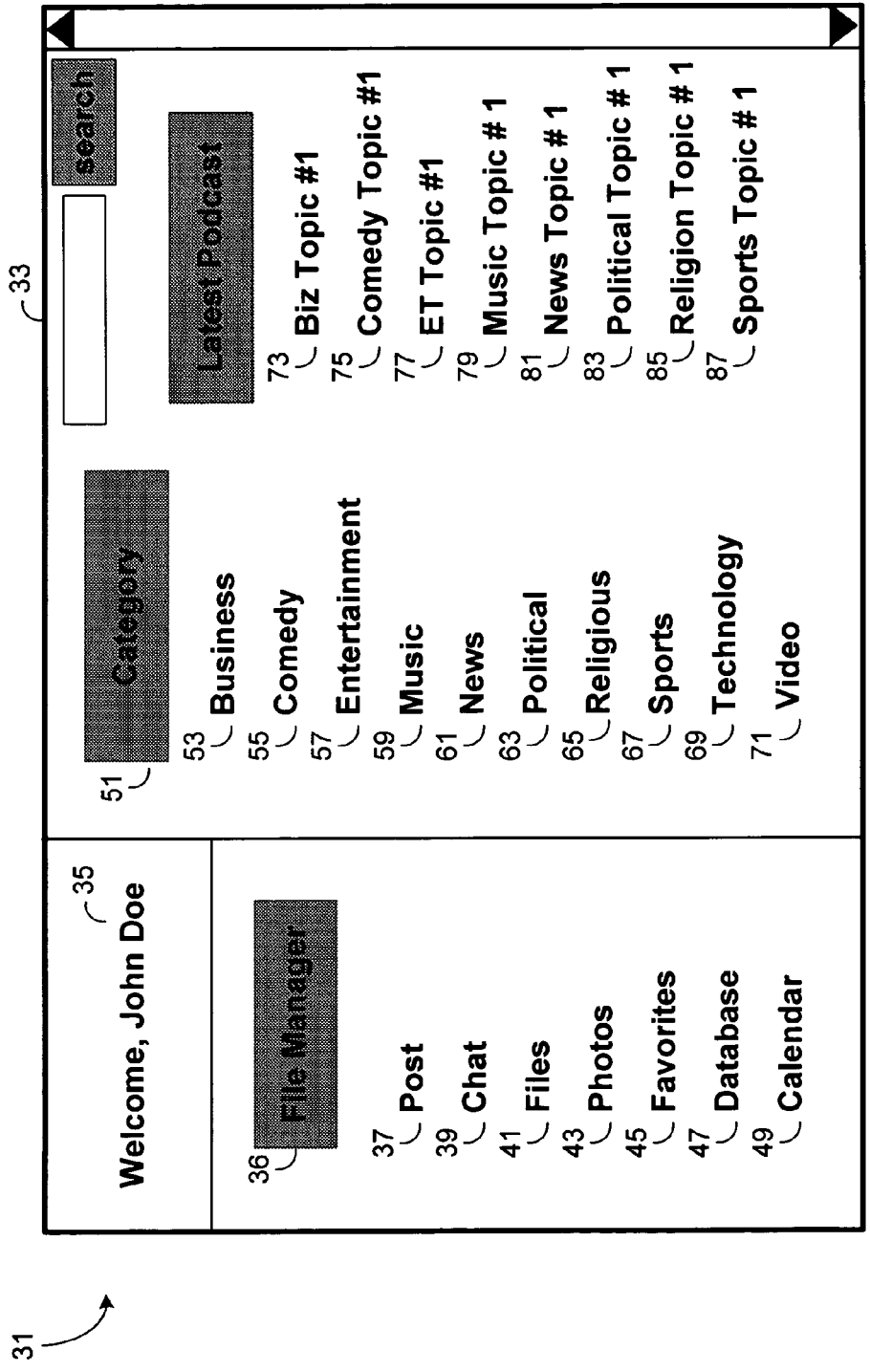
FIG. 3 is an illustration of a display associated with a podcaster web page according to one embodiment.

FIG. 3 is an exemplary display of a web page from a podcast host server 3. The web page 31 can be displayed when a subscriber registers with the podcast host server 3 via the network 9. The podcast host server 3 can provide a web page that is personalized to the subscriber. The web page 31 includes a file manager 36 that manages the information downloaded through the web page 31. The file manager 36 includes links for posting podcast files 37, chatting with other members of the podcast community 39, accessing files 41 downloaded through the web page 31, accessing podcast files 43 downloaded through the web page 31, accessing favorite web sites 45, accessing a database 47 that lists the podcast files posted by others, and managing a subscriber's schedule through an on-line calendar 49.

The web page 31 includes categories 51 of various subject matter, such as, but are not limited to, business 53, comedy 55, entertainment 57, music 59, news 61, political 63, religious 65, sports 67, technology 69, and video 71. The subscriber can select one of the listed categories 51 to find podcast files related to the selected category. The web page 31 further includes a list of latest podcast, such as, but is not limited to, Biz top #1 73, comedy topic #1 75, ET topic #1 77, music topic #1 79, news topic #1 81, political topic #1 83, religion topic #1 85, and sports topic #1 87. The subscriber can select one of the listed latest podcast files to download and listen.

Figure 4:
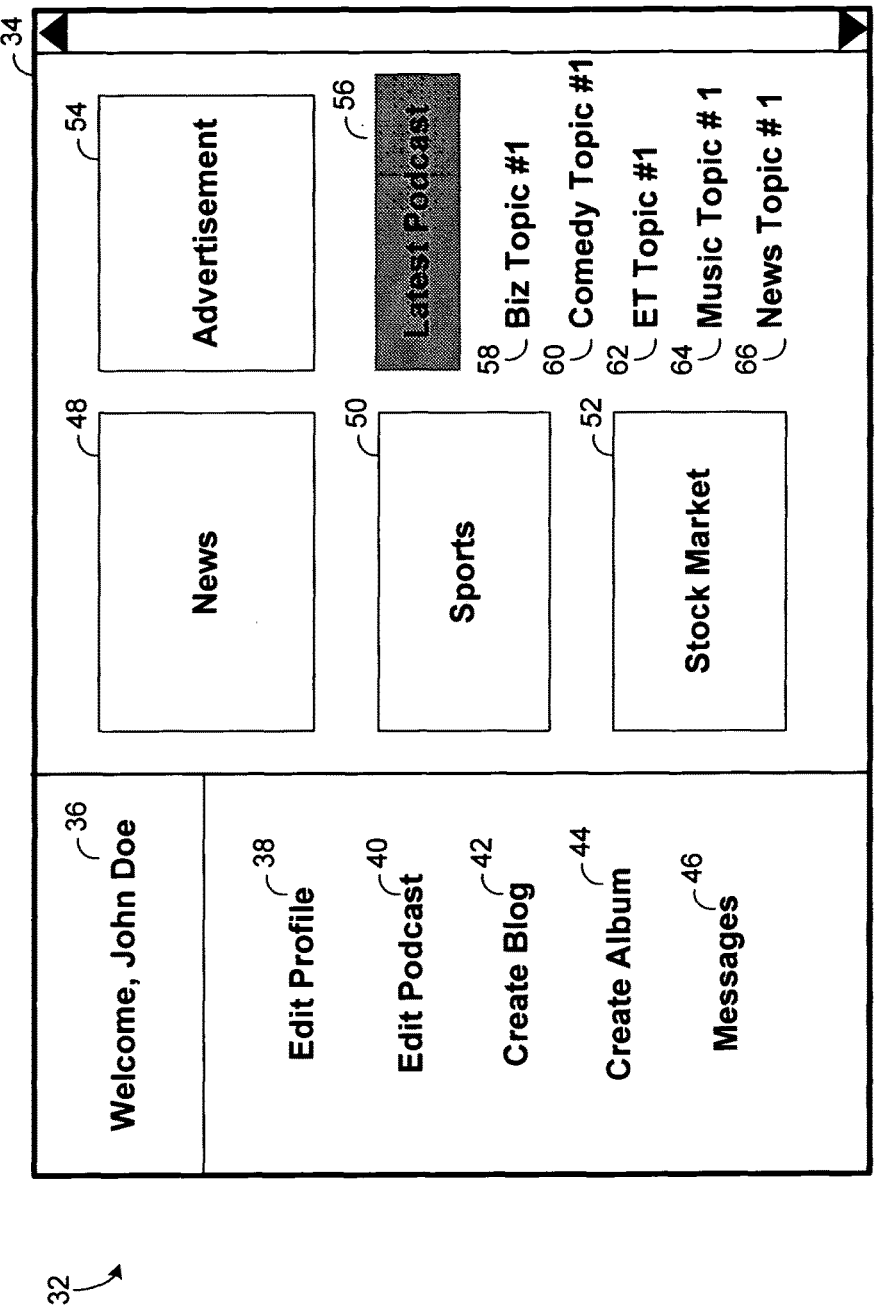
FIG. 4 is an illustration of a display associated with a provider home web page according to one embodiment.

FIG. 4 is an exemplary display of a provider home web page 32. The web page 32 can be displayed when the subscriber computing device 5 or other subscriber computing devices establish a connection to the network 9 through the network provider server 7. For example, after the subscriber computing device 5 or other subscriber computing device connects to the network 9 through the network provider server 7, a web page can appear on the user interface device 23 of the subscriber computing device 5 or other subscriber computing device that is provided by the network provider server 7. In another example, after the connection is established between the subscriber computing device 5 and the network 9, the network provider server can provide a web site for the subscriber so that the subscriber can personalize the web site. The subscriber accesses the subscriber's personalized web site provided by the network provider server 7 and the subscriber can post pictures, wedding information, personal diaries, blog, etc.

The web page 32 can provide links for editing the subscriber's profile 38, editing podcast files 40, creating a blog 42, creating photograph albums 44, and accessing, sending, or delivering messages 46. The provider home web page 61 can further provide links for more details on the news 48, sports 50, stock market 52, and advertisement 54. The provider home web page 61 can further provide links for a list of the latest podcast files 56, such as, but is not limited to, biz topic #1 58, comedy topic #1 60, ET topic #1 62, music topic #1 64, and news topic #1 66.

Figure 5:
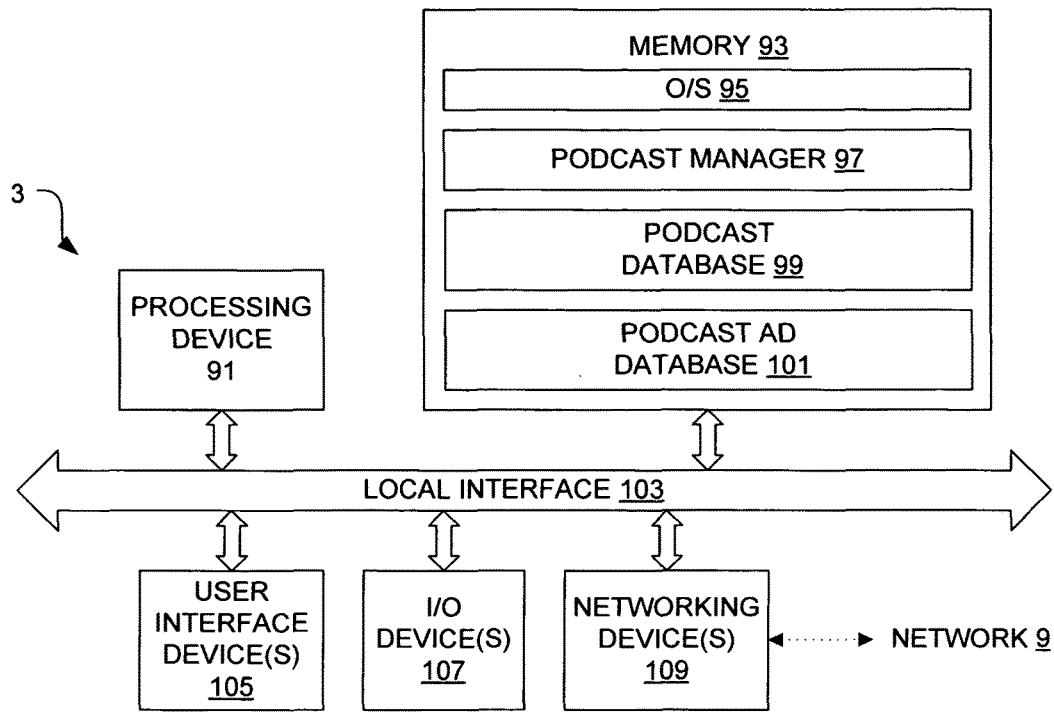
FIG. 5 is a block diagram of an embodiment of a podcast host server shown in FIG. 1.

FIG. 5 is a block diagram of an embodiment of a podcast host server shown in FIG. 1. The architecture for the podcast host server 3 is similar to the architecture of the subscriber computing device 5 described above and therefore includes a processing device 91, one or more user interface devices 105, one or more I/O devices 107, and one or more networking devices 109, each of which is connected to a local interface 103.

The memory 93 in the podcast host server 3 includes, among other elements, a podcast manager 97, podcast database 99, and podcast advertisement database 101, all of which facilitate inserting an advertisement into podcast files and providing podcast files with the advertisements to a subscriber. According to an exemplary embodiment, the podcast manager 97 communicates with a subscriber computing device 5 or other subscriber computing devices via the network 9 to provide podcast files with advertisements to subscribers. More particularly, the podcast manager 97 downloads a podcast file from a subscriber and inserts the advertisements into the podcast file. The same or another subscriber can download the podcast file inserted with advertisements from the podcast host server 3 through the subscriber computing device 5 or other subscriber computing device and the network 9.

Figure 6:
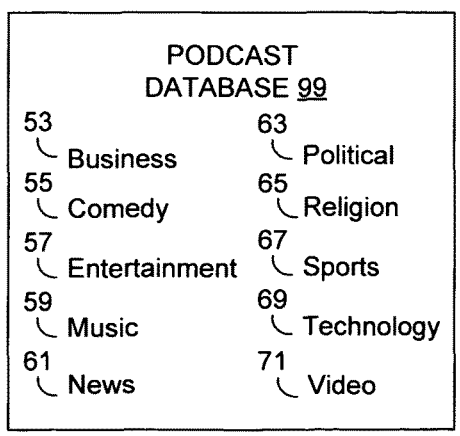
FIG. 6 is a block diagram of an embodiment of a podcast database shown in FIG. 5.
Figure 7:
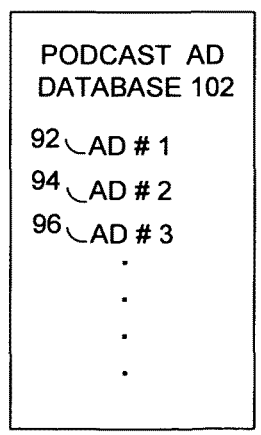
FIG. 7 is a block diagram of an embodiment of a podcast advertisement database shown in FIG. 5.
Figure 8:
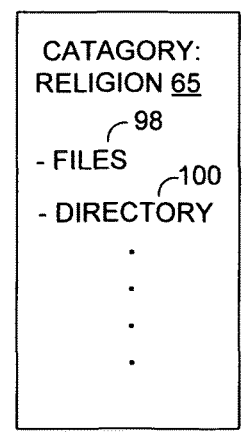
FIG. 8 is a block diagram of an embodiment of a podcast religion category shown in FIG. 6.

FIG. 6 is a block diagram of an embodiment of a podcast database shown in FIG. 5. The podcast database 99 contains the downloaded podcast files from subscribers or remote servers 11 in various categories, such as, as mentioned above, business 53, comedy 55, entertainment 57, music 59, news 61, political 63, religious 65, sports 67, technology 69, and video 71. When a subscriber or remote server downloads a podcast file, the podcast file is placed in one of the available podcast categories. FIG. 7 is a block diagram of an embodiment of a podcast advertisement database shown in FIG. 5. The podcast advertisement database 102 contains files of advertisements, preferably downloaded to the podcast host server 3 or network provider server 7 at a particular cost. FIG. 8 is a block diagram of an embodiment of a podcast religion category shown in FIG. 6. Each category of podcast files, such as the category of religion 65, includes podcast files 98 that are related to the category and a directory 100 of the podcast files.

Figure 9:
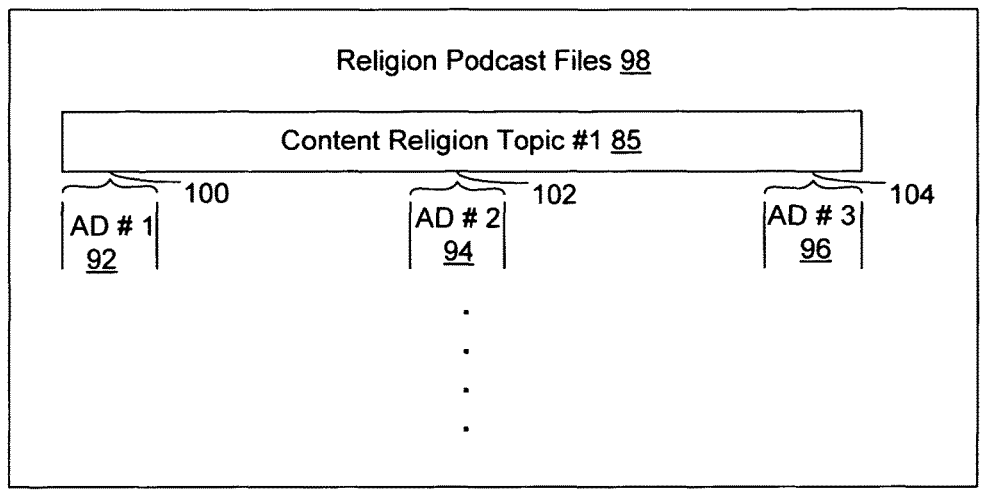
FIG. 9 is a block diagram of an embodiment of religion podcast files from the podcast religion category shown in FIG. 8.

FIG. 9 is a block diagram of an embodiment of religion podcast files shown in FIG. 8. Each podcast file can include a content of the file and inserted advertisements. For example, religion topic #1 85 includes a content that is insert with ad #1 92 at the beginning 100 of the podcast file, with ad #2 94 at the middle 102 of the podcast file, and with ad #3 96 at the end 104 of the podcast file. In another example, religion topic #2 86 includes a content that is insert with ad #4 108 at the beginning 110 of the podcast file, with ad #3 96 at the middle 112 of the podcast file, and with ad #2 94 at the end 114 of the podcast file. It should be understood that advertisements can be inserted anywhere in the content of the podcast file. In this example, the podcast files once received, are modified to have the advertisements inserted in the locations as shown in FIG. 9 and then the podcast files including the inserted advertisements are stored for subsequent access by subscribers.

Additionally, it should be appreciated that the podcast files may be stored without advertisements, and then advertisements may be inserted into the podcast files as the podcast files are being provided from the podcast host server 3 to the subscriber computing device. In this manner, the advertisements may be maintained current up to the time the request for the podcast is made, whereas the advertisements may not be as current in the example where the podcast file is stored with the advertisement already inserted.

Figure 10:
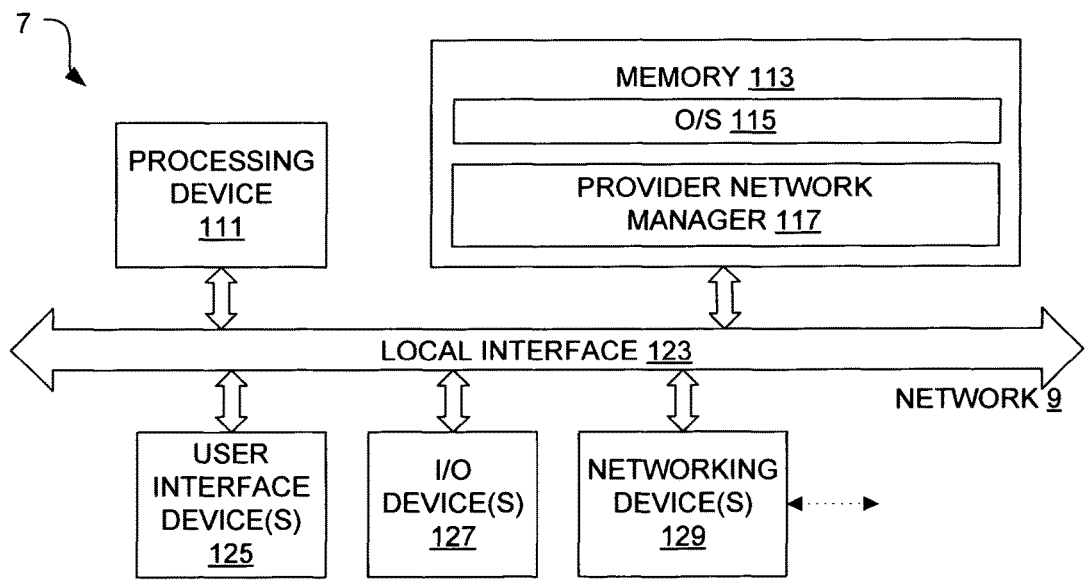
FIG. 10 is a block diagram of an embodiment of network provider server shown in FIG. 1.

FIG. 10 is a block diagram of an embodiment of a network provider server shown in FIG. 1. The architecture for the network provider server 7 is similar to the architecture of the subscriber computing device 3 described above and therefore includes a processing device 111, one or more user interface devices 125, one or more I/O devices 127, and one or more networking devices 129, each of which is connected to a local interface 123.

The memory 113 in the network provider server 7 includes, among other elements, a network provider manager 117 that facilitates providing podcast files inserted with advertisements to a subscriber. According to an exemplary embodiment, the network provider manager 117 communicates with a subscriber computing device 5 or other subscriber computing device via the network 9 to provide podcast files to the subscriber computing device that has requested it. More particularly, the network provider manager 117 facilitates establishing communication between the subscriber computing device that may transmit or request a podcast and the podcast host server 3.

The subscriber computer device that may transmit or request a podcast receives the web page of the podcast host server 3 that includes a database of podcast files, either already inserted with advertisements or to have advertisements inserted once requested. In an alternative embodiment, the subscriber computing device can receive a web page of the network provider server 7 that includes a database of podcast files, either already inserted with advertisements or to have advertisements inserted once requested. When the subscriber selects a podcast file from the web page of the network provider server 7, the subscriber is directed to another web page from the podcast host server 3 to download the selected podcast file.

Various programs have been described above. It is to be understood that these programs can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, or transport the program for use by or in connection with the instruction execution system, apparatus, or device.

The computer-readable medium can be, for example, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Example systems having been described above, system operation will now be discussed. In the discussions that follow, flow diagrams are provided. Any process steps or blocks in these flow diagrams may represent modules, segments, or portions of code, preferably stored and/or communicated on recordable medium as logic, that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Figure 11:
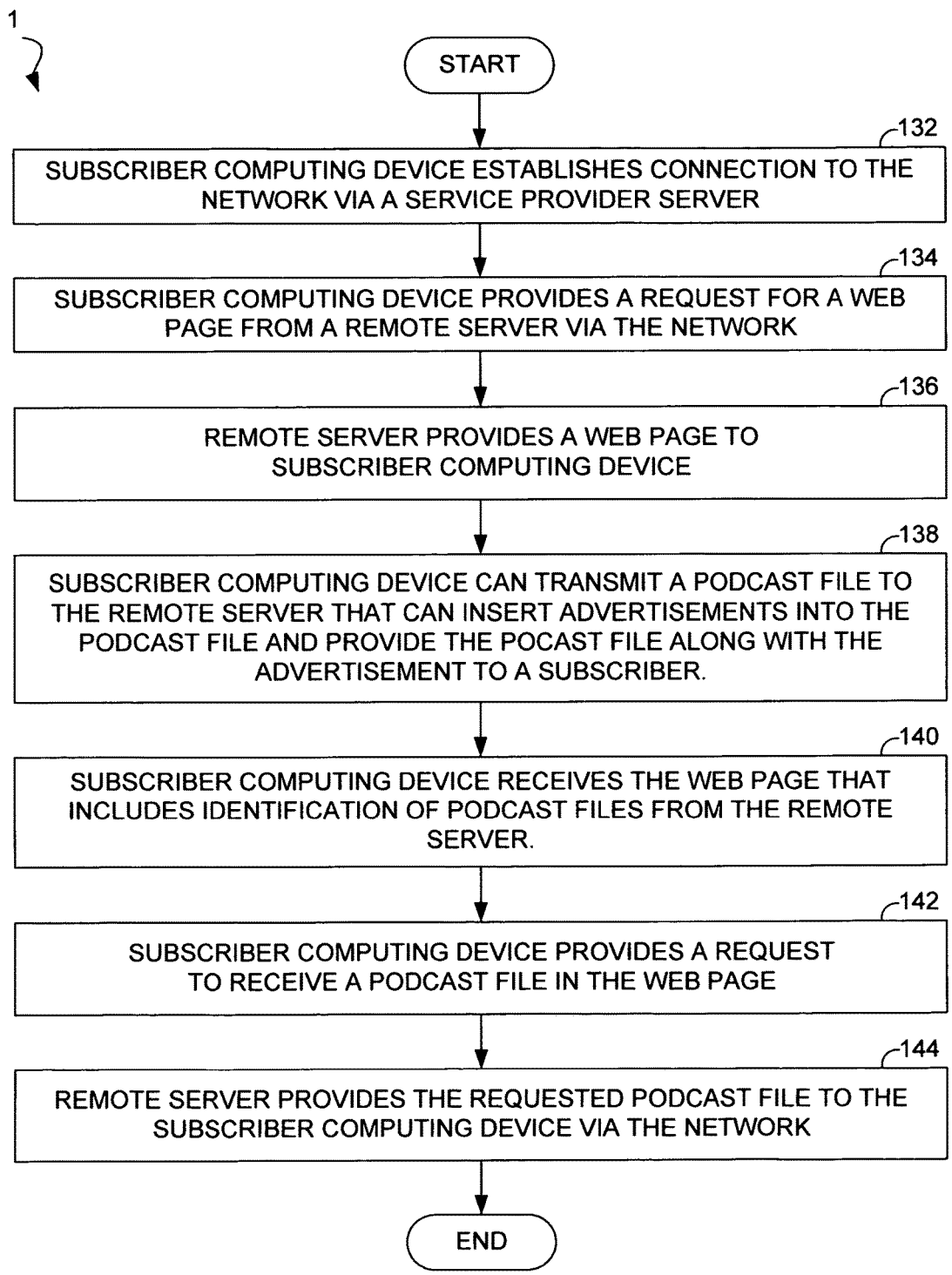
FIG. 11 is a flow diagram that illustrates an embodiment of an operation of a system including remote servers shown in FIG. 1 in providing a podcast file that is inserted with advertisements.

FIG. 11 is a flow diagram that illustrates an embodiment of an operation of a system shown in FIG. 1 in providing a plurality of podcast files inserted with advertisements via the network. Beginning with block 132, the system 1 for providing podcast files inserted with advertisements via the network 9 includes a subscriber computing device 5 that establishes connection to the network 9 via a remote server 11. The subscriber computing device 5 can communicate an IP address that was assigned to the subscriber computing device 5 by the network provider server 7. The subscriber computing device 5 can be assigned a temporary internet protocol (IP) address for the duration if a dial-in session is being established. The subscriber computing device 5 can be a permanent IP address or it might obtain a temporary one from a DHCP (Dynamic Host Configuration Protocol) server if the subscriber computing device 5 connects to the network 9 from a local area network (LAN) (not shown). In any case, if the subscriber computing device 5 is connected to the network 9, the subscriber computing device 5 has a unique IP address.

In block 134, the subscriber computing device 5 provides a request for a web page from a remote server 11 via the network 9. In block 136, the remote server 11 provides a web page to the subscriber computing device 5. In block 138, the subscriber computing device 5 can transmit a podcast file to the remote server 11 that can insert advertisements into the podcast file and provide the podcast file along with the advertisement to a subscriber. In block 140, the subscriber computing device 5 receives the web page that includes identifications of podcast files from the remote server 11. In block 142, the subscriber computing device 5 provides a request to receive a podcast file from the remote server 11 via the network 9. In block 144, the remote server 11 provides the requested podcast file along with the inserted advertisements to the subscriber computing device 5. It will be appreciated that the subscriber computing device 5 may request the podcast that has been transmitted by the subscriber computing device 5 or may request a podcast that has been transmitted by another subscriber computing device of another subscriber. It will also be appreciated that other subscriber computing devices of other subscribers may access the remote server 11 to request the podcast that has been transmitted by subscriber device 5.

Figure 12:
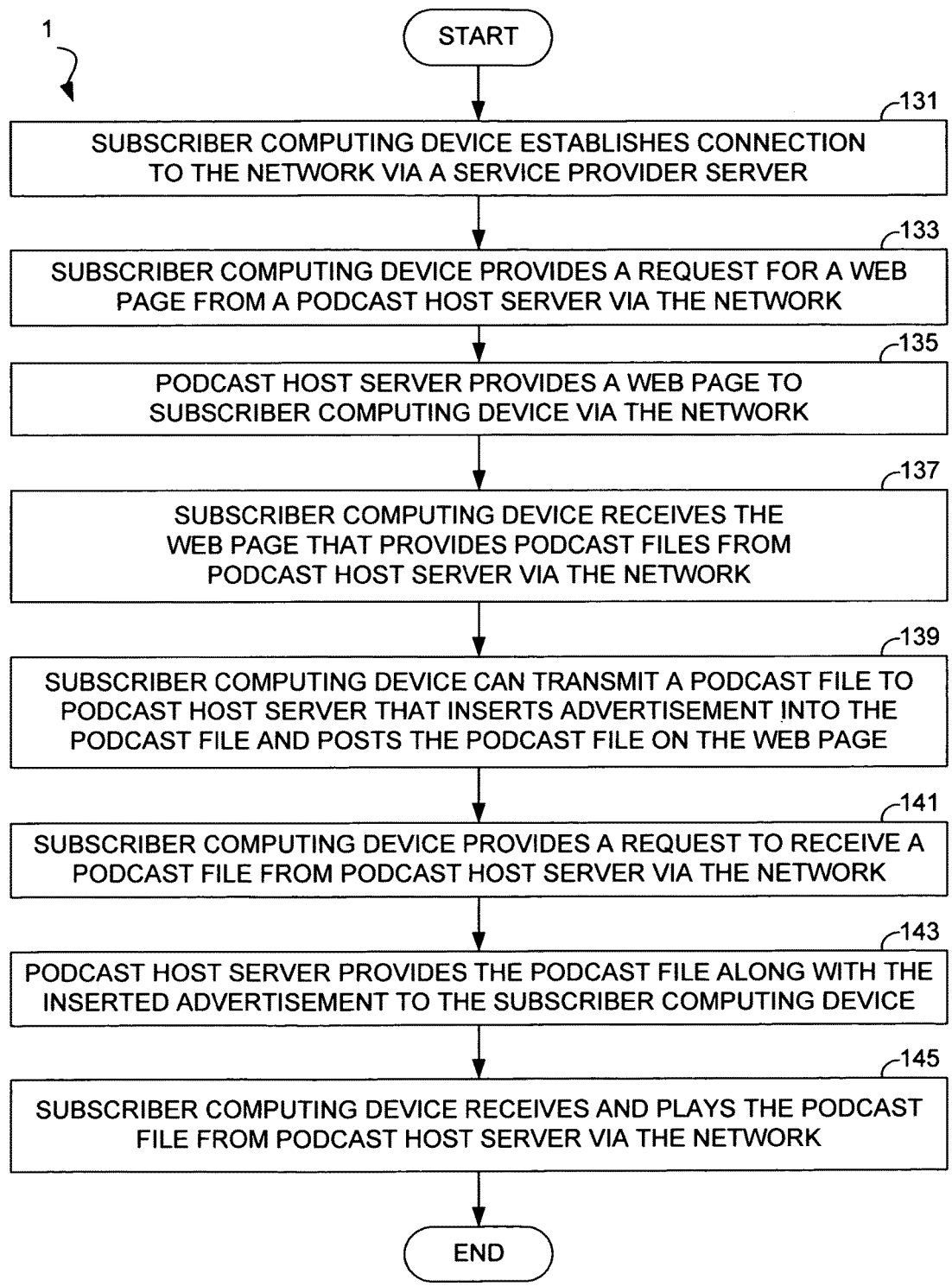
FIG. 12 is a flow diagram that illustrates an embodiment of an operation of a system including a podcast host server shown in FIG. 1 in providing a podcast file that is inserted with advertisements.

FIG. 12 is a flow diagram that illustrates an embodiment of an operation of a system shown in FIG. 1 in providing a plurality of podcast files inserted with content distinct from the uploaded podcast content, e.g., advertisements via the network. Beginning with block 131, the system 1 for providing podcast files inserted with advertisements via the network 9 includes a subscriber computing device 5 that establishes connection to the network 9 via a network provider server 7. In block 133, the subscriber computing device 5 provides a request for a web page from a podcast host server 3 via the network 9. It should be understood that the request for the web page may be from the server provider web page that includes an identification of podcast files 56, 58, 60, 62, 64, 66 as indicated in FIG. 4. The subscriber can click on the identification and link to the web page of the podcast host server 3.

In block 135, the podcast host server 3 provides a web page to the subscriber computing device 5. In block 137, the subscriber computing device 5 receives the web page that provides the podcast files from a podcast host server 3 via the network 9. In block 139, the subscriber computing device 5 can transmit a podcast file to the podcast host server 3, which inserts an advertisement into the podcast file, stores the podcast file along with the inserted advertisement in a podcast, and posts the podcast file on the web page. In block 141, the subscriber computing device 5 provides a request to receive a podcast file from the podcast host server 3 via the network 9. In block 143, the podcast host server 3 provides the requested podcast file that is inserted with advertisements to the subscriber computing device 5. In block 145, the subscriber computing device 5 receives and plays the podcast file along with the inserted advertisements from the podcast host server 7 via the network 9. As previously discussed, it will be appreciated that the subscriber computing device 5 may request the podcast that has been transmitted by the subscriber computing device 5 or may request a podcast that has been transmitted by another subscriber computing device of another subscriber. It will also be appreciated that other subscriber computing devices of other subscribers may access the podcast host server 3 to request the podcast that has been transmitted by subscriber device 5.

Figure 13:
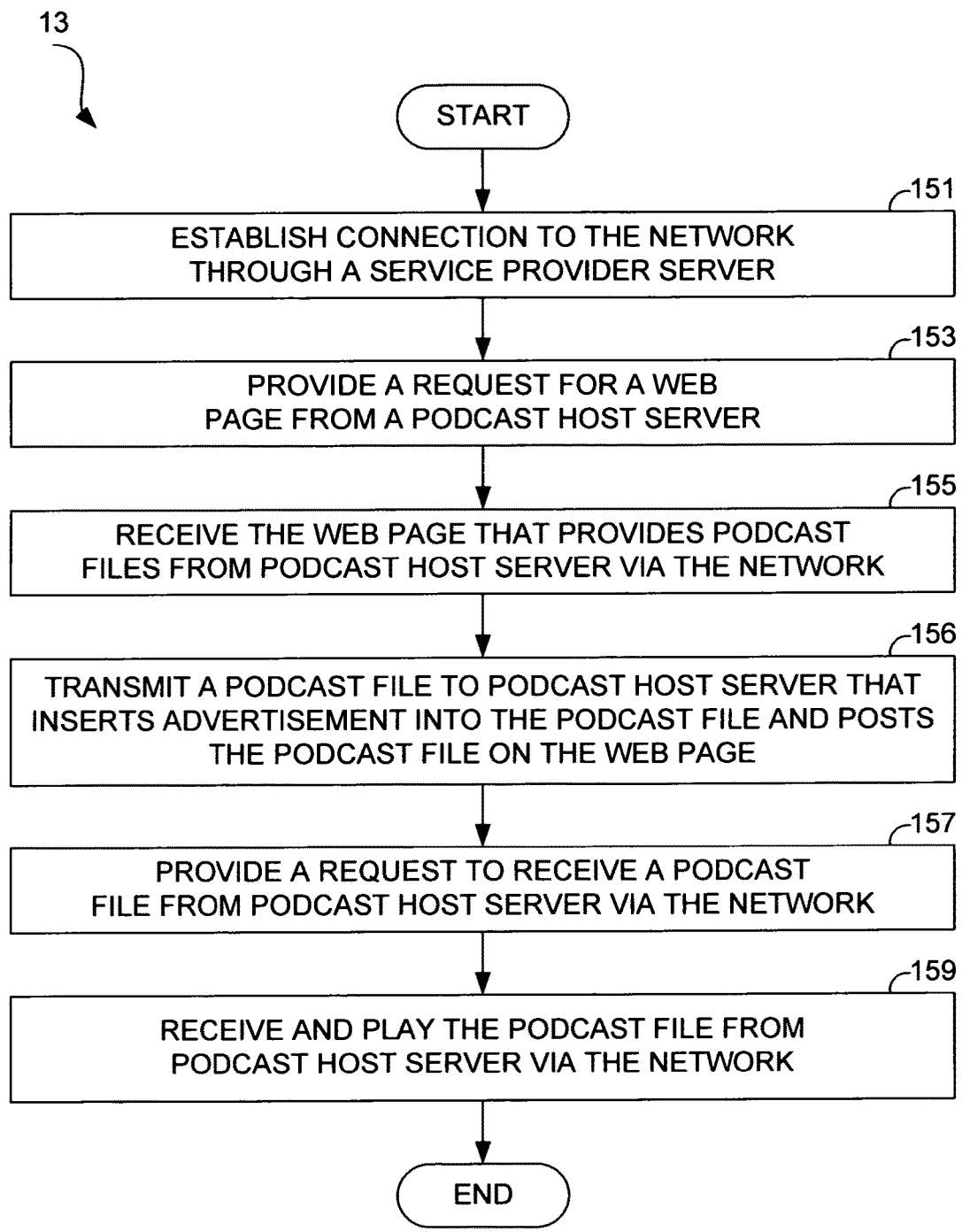
FIG. 13 is a flow diagram that illustrates an embodiment of operation of a subscriber network manager of the network provider server shown in FIG. 2.

FIG. 13 is a flow diagram that illustrates an embodiment of operation of a subscriber network manager of a subscriber computing device shown in FIG. 2. The subscriber network manager 13, as indicated in block 151, establishes a connection to the network 9 through a network provider server 7. In block 153, the subscriber network manager 13 provides a request from a web page of a podcast host server 3 to download a podcast file. In an alternative embodiment, the subscriber network manager 13 provides a request from a web page of a network provider server 7, which in response, directs the subscriber network manager 13 to the web page of the podcast host server 3 to download podcast files.

In block 155, the subscriber network manager 13 receives a web page that provides podcast files inserted with advertisements from a podcast host server 3. In block 156, the subscriber network manager 13 transmits a podcast file to podcast host server 3 that inserts advertisement into the podcast file, stores the podcast file along with the inserted advertisement, and posts the podcast file on the web page. In block 157, the subscriber network manager 13 provides a request to receive a podcast file from the podcast host server 3 via the network 9. In block 159, the subscriber network manager 13 receives and plays the requested podcast file downloaded from the podcast host server 3 via the network 9.

Figure 14:
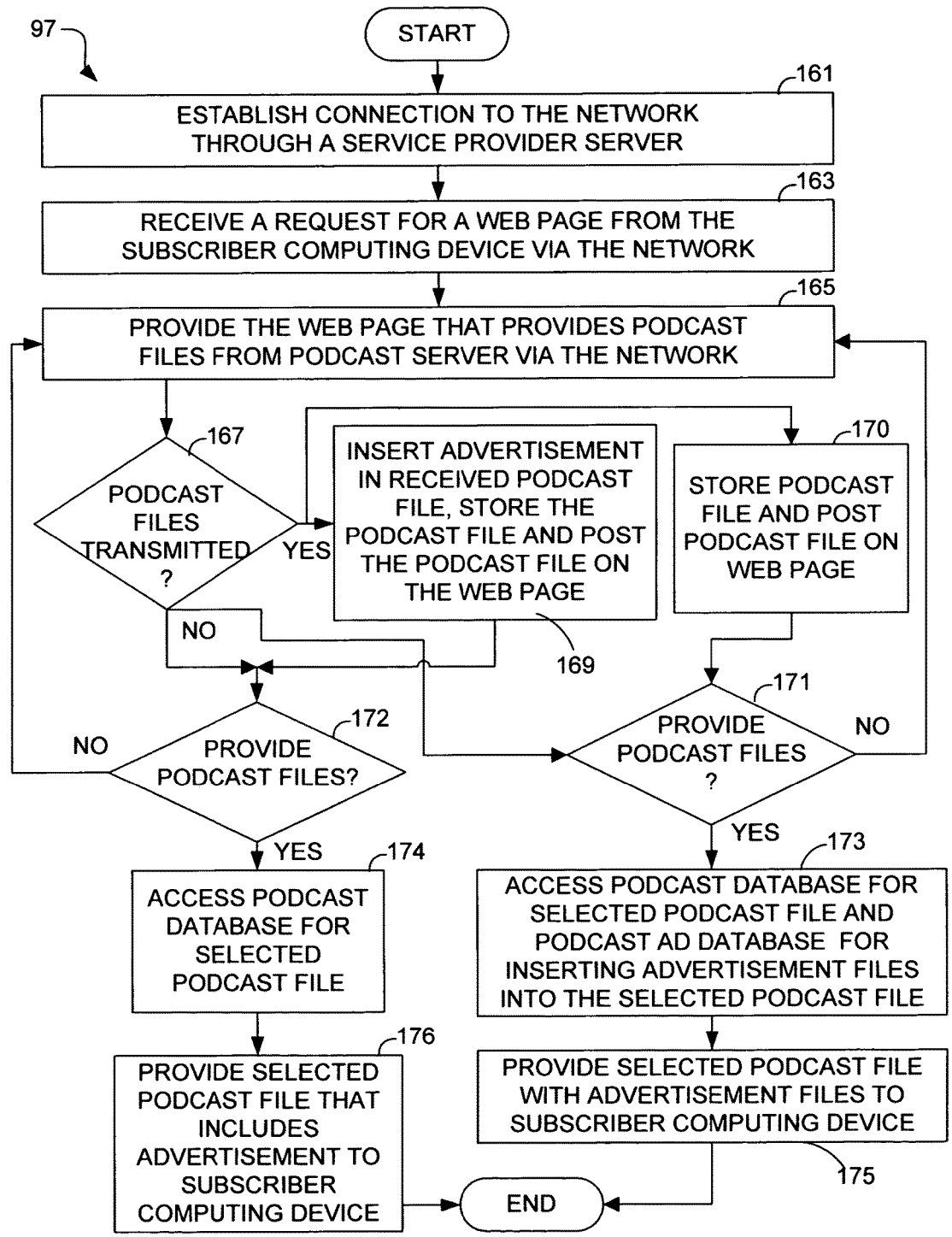
FIG. 14 is a flow diagram that illustrates an embodiment of operation of a podcast manager of the podcast host server that is shown in FIG. 5.

FIG. 14 is a flow diagram that illustrates an embodiment of operation of a podcast server manager of the podcast host server shown in FIG. 5. The podcast manager 97 establishes, as indicated in block 161, a connection to the network 9 through a network provider server 7. In block 163, the podcast manager 97 receives a request from a subscriber computing device 5 via the network 9 and in block 165, provides the subscriber computing device 5 a web page that provides podcast files from the podcast host server 3 via the network 9. In block 167, the podcast manager 97 determines whether a podcast file was transmitted to the podcast host server 7 by a subscriber.

Two examples are shown in FIG. 14. According to a first example, if a podcast file was transmitted from the subscriber computing device 5 to the podcast host sever 7, the podcast manager 97, as indicated in block 169, receives the transmitted podcast file, inserts an advertisement from a podcast advertisement database 101 into the podcast file, stores the podcast file along with the inserted advertisement into a podcast database 99, and posts the podcast file on the web page of the podcast host server 7. If a podcast file was not transmitted, the podcast manager 97, as indicated in block 171, determines whether a podcast file was selected by a subscriber. If a podcast file was not selected, the podcast manager 97 is referred to block 165 and continues to present the podcast files in the web page. If a podcast file was selected, the podcast manager 97, as indicated in block 1744, accesses the requested podcast file from a podcast database 99 and provides the requested podcast file along with the already inserted advertisement to the subscriber computing device 5. In block 1766, the podcast manager 97 provides the requested podcast file with the already inserted advertisement to the subscriber computing device 5.

According to a second example, if a podcast file was transmitted from the subscriber computing device 5 to the podcast host sever 7, the podcast manager 97, as indicated in block 169, receives the transmitted podcast file and then stores the podcast file without any advertisement being inserted into a podcast database 99, and posts the podcast file on the web page of the podcast host server 7. If a podcast file was not transmitted, the podcast manager 97, as indicated in block 172, determines whether a podcast file was selected by a subscriber. If a podcast file was not selected, the podcast manager 97 is referred to block 165 and continues to present the podcast files in the web page. If a podcast file was selected, the podcast manager 97, as indicated in block 173, accesses the requested podcast file from a podcast database 99 and provides the requested podcast file along with the already inserted advertisement to the subscriber computing device 5. In block 176, the podcast manager 97 provides the requested podcast file as well as one more advertisement files to the subscriber computing device 5. When providing the podcast file, then podcast manager 97 may perform the insertion of the advertisements from the advertisement file into the podcast file being transmitted. As an alternative, markers where the advertisements are to be inserted may be placed into the podcast file, either when it was originally stored or at that time is has been requested, such that the subscriber computing device that has requested the podcast is instructed to insert a particular advertisement from an advertisement file upon encountering the marker during playback of the podcast file.

Figure 15:
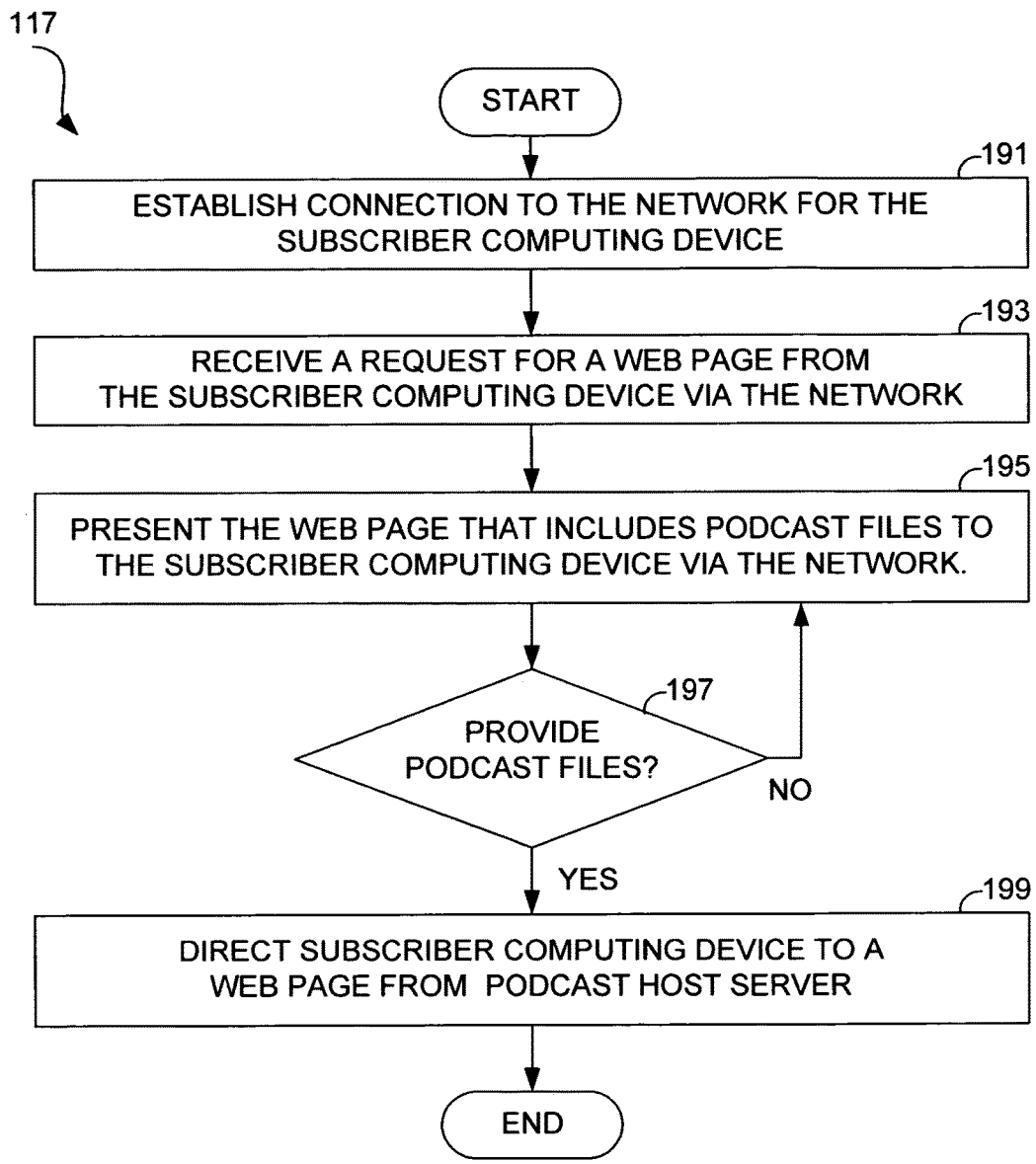
FIG. 15 is a flow diagram that illustrates an embodiment of operation of a network provider manager of the network provider server that is shown in FIG. 10.

FIG. 15 is a flow diagram that illustrates an embodiment of operation of a network provider manager of the network provider server that is shown in FIG. 6. In block 191, the network provider manager 117 establishes connection to the network 9 for the subscriber computing device 5. In block 193, the network provider manager 117 receives a request for a web page from the subscriber computing device 5 via the network 9. In block 195, the network provider manager 117 presents the web page that includes links to download podcast files to the subscriber computing device 5 via the network 9.

In block 197, the network provider manager 117 determines whether the subscriber selected a podcast file from the web page. If a podcast file was not selected, the subscriber computing device 5 continues to receive the web page that includes links to download the podcast files from the network provider server 7. If a podcast file was selected, the network provider manager 117, as indicated in block 199, directs the subscriber computing device 5 to a web page from a podcast host server and the podcast manager 97 communicates with the subscriber computing device 5, starting at block 165 of FIG. 14.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. For example, as noted above, the content that is inserted that is distinct from the podcast content may be one or more of many different types of information including advertisements, news bulletins, related information, etc. All such modifications and variations are intended to be included herein within the scope of this disclosure and the present disclosure and protected by the following claims.

Therefore, having thus described the disclosure, at least the following is claimed:

1. A device, comprising:
    a processor; and
    a memory having instructions stored thereon which, when executed by the processor, cause the processor to perform operations comprising:
        receiving podcast files;
        sorting the podcast files into different categories associated with different topics based on podcast content included in the podcast files, such that each individual category includes a subset of the podcast files, each containing the podcast content that is related to an individual topic associated with the individual category;
        associating items of other content, that are distinct from the podcast content, with the different categories by relating the items of other content with the individual topics associated with the individual categories; and
        responsive to a request to download a particular podcast file sorted in a particular category, inserting multiple ones of the items of other content at different points within the particular podcast file including inserting at least one of the items of other content within the particular podcast file based on the association of the at least one of the items of other content with the particular category and providing the particular podcast file with the multiple ones of the items of other content inserted.

2. The device of claim 1, wherein each individual category of podcast files further includes a directory of the podcast files included in the individual category.

3. The device of claim 1, wherein the at least one of the items of other content, that is distinct from the podcast content, includes an advertisement.

4. The device of claim 1, wherein the processor receives the podcast files from a subscriber device.

5. The device of claim 1, wherein the processor receives the request for the particular podcast files from a subscriber device.

6. The device of claim 5, wherein the at least one of the items of other content, that is distinct from the podcast content, is inserted in the particular podcast file by the subscriber device requesting the particular podcast file.

7. The device of claim 1, wherein the different topics include at least one of business, comedy, entertainment, music, news, politics, religion, sports, technology, and video.

8. A method, comprising:
receiving, by a processor, podcast files;
sorting, by the processor, the podcast files into different categories associated with different topics based on podcast content included in the podcast files, such that each individual category includes a subset of the podcast files, each containing the podcast content that is related to an individual topic associated with the individual category;
associating, by the processor, items of other content, that are distinct from the podcast content, with the different categories by relating the items of other content with the individual topics associated with the individual categories; and
responsive to a request to download a particular podcast file sorted in a particular category, inserting multiple ones of the items of other content at different points within the particular podcast file including inserting at least one of the items of other content within the particular podcast file based on the association of the at least one of the items of other content with the particular category and providing the particular podcast file with the multiple ones of the items of other content inserted.

9. The method of claim 8, wherein each individual category of podcast files further includes a directory of the podcast files included in the individual category.

10. The method of claim 8, wherein the at least one of the items of other content, that is distinct from the podcast content, is inserted in the particular podcast file once the request to download the particular podcast file is received.

11. The method of claim 8, wherein the at least one of the items of other content, that is distinct from the podcast content, includes an advertisement.

12. The method of claim 8, wherein the podcast files are received from a subscriber device.

13. The method of claim 8, wherein the request for the particular podcast file is received from a subscriber device.

14. The method of claim 8, wherein the different topics include at least one of business, comedy, entertainment, music, news, politics, religion, sports, technology, and video.

15. A non-transitory computer readable medium having instructions stored thereon which, when executed by a processor, cause the processor to perform operations comprising:
receiving podcast files;
sorting the podcast files into different categories associated with different topics based on podcast content included in the podcast files, such that each individual category includes a subset of the podcast files, each containing the podcast content that is related to an individual topic associated with the individual category;
associating items of other content, that are distinct from the podcast content, with the different categories by relating the items of other content with the individual topics associated with the individual categories; and
responsive to a request to download a particular podcast file sorted in a particular category, inserting multiple ones of the items of other content at different points within the particular podcast file including inserting at least one of the items of other content within the particular podcast file based on the association of the at least one of the items of other content with the particular category and providing the particular podcast file with the multiple ones of the items of other content inserted.

16. The non-transitory computer readable medium of claim 15, wherein each individual category of podcast files further includes a directory of the podcast files included in the individual category.

17. The non-transitory computer readable medium of claim 15, wherein the at least one of the items of other content, that is distinct from the podcast content, is inserted in the particular podcast file once the request to download the particular podcast file is received.

18. The non-transitory computer readable medium of claim 15, wherein the at least one of the items of other content, that is distinct from the podcast content, includes an advertisement.

* * * * *